US012560798B1

(12) United States Patent
Zhou

(10) Patent No.: US 12,560,798 B1
(45) Date of Patent: Feb. 24, 2026

(54) AIMING ASSISTANCE DEVICE AND OPTICAL SIGHT

(71) Applicant: Pengfei Zhou, Zhejiang (CN)

(72) Inventor: Pengfei Zhou, Zhejiang (CN)

( * ) Notice: Subject to any disclaimer, the term of this patent is extended or adjusted under 35 U.S.C. 154(b) by 0 days.

(21) Appl. No.: 19/312,300

(22) Filed: Aug. 28, 2025

(30) Foreign Application Priority Data

Jul. 31, 2025    (CN) .......................... 202521614807.4

(51) Int. Cl.
G02B 23/16 (2006.01)
G02B 23/10 (2006.01)
(52) U.S. Cl.
CPC ............. G02B 23/16 (2013.01); G02B 23/10 (2013.01)
(58) Field of Classification Search
CPC ................................ G02B 23/16; G02B 23/10
USPC ......................................................... 359/726
See application file for complete search history.

(56) References Cited

U.S. PATENT DOCUMENTS 7,516,571 B2 *    4/2009    Scrogin ..................... F41G 3/08
42/114
7,990,523 B2 *    8/2011    Schlierbach ............ F41G 3/065
356/5.01

* cited by examiner

*Primary Examiner* — William Choi

(57)            ABSTRACT

An aiming assistance device is configured to be mounted on an optical sight. The optical sight includes a lens barrel and a plurality of adjustment handwheels protruding from an outer wall of the lens barrel. A gap area is formed between any two of the plurality of adjustment handwheels which are adjacent to each other. The lens barrel is configured for an external light to pass through. The aiming assistance device comprises a detection mechanism, a display, and a light deflection module. The detection mechanism is configured to emit a detection ray and obtain measurement information via the detection ray. The detection ray is capable of passing through the gap area. The display is configured to emit a display light containing the measurement information. The light deflection module is configured to reflect the display light, wherein the external light is capable of passing through the light deflection module.

19 Claims, 14 Drawing Sheets

AIMING ASSISTANCE DEVICE AND OPTICAL SIGHT

CROSS REFERENCE TO RELATED APPLICATIONS

This application claims priority to Chinese application number 202521614807.4, filed on Jul. 31, 2025, the disclosure of which are incorporated by reference herein in their entireties.

FIELD OF THE DISCLOSURE

The present disclosure relates to the field of optoelectronic technology, and in particular to an aiming assistance device and an optical sight.

BACKGROUND

An optical sight may include a lens barrel, an objective lens at a front end of the lens barrel, and an eyepiece at a rear end of the lens barrel. A visual area is formed behind the eyepiece, and a human eye is placed in the visual area to obtain light passing through the objective lens and the eyepiece, and to form an image in an eyeball. In addition, an outer wall of the lens barrel is usually equipped with three radially protruding adjustment handwheels, including an upper handwheel, a left handwheel, and a right handwheel, for adjusting a reticle, correcting ballistic deviation, and adjusting a focal length of the optical sight. To expand a function of the optical sight, a rangefinder is often equipped or integrated on the lens barrel of the optical sight. In order to avoid mechanical interference from these adjustment handwheels, the rangefinder must be mounted outside a highest point of the adjustment handwheels, which leads to an excessive distance between a detection ray and an axis of the lens barrel of the optical sight. The excessive distance leads to an increase in ranging error, and moreover, makes a volume of the optical sight larger, affecting portability.

SUMMARY

The following presents a simplified summary of the disclosure in order to provide a basic understanding of some aspects of the disclosure. This summary is not an extensive overview of the disclosure. It is not intended to identify critical elements or to delineate the scope of the disclosure. Its sole purpose is to present some concepts of the disclosure in a simplified form as a prelude to the more detailed description that is presented elsewhere.

In some embodiments, an aiming assistance device is provided. The aiming assistance device can be mounted on an optical sight. The optical sight includes a lens barrel and a plurality of adjustment handwheels protruding from an outer wall of the lens barrel. A gap area is formed between any two of the plurality of adjustment handwheels which are adjacent to each other. The lens barrel is configured for an external light to pass through. The aiming assistance device comprises a detection mechanism, a display, and a light deflection module. The detection mechanism is configured to emit a detection ray and obtain measurement information via the detection ray. The detection ray is capable of passing through the gap area. The display is configured to emit a display light containing the measurement information. The light deflection module is configured to reflect the display light, wherein the external light is capable of passing through the light deflection module.

In other embodiments, an optical sight is provided. The optical sight includes the aiming assistance device described above.

BRIEF DESCRIPTION OF THE DRAWINGS

Illustrative embodiments of the present disclosure are described in detail below with reference to the attached drawing figures.

Figure 1:
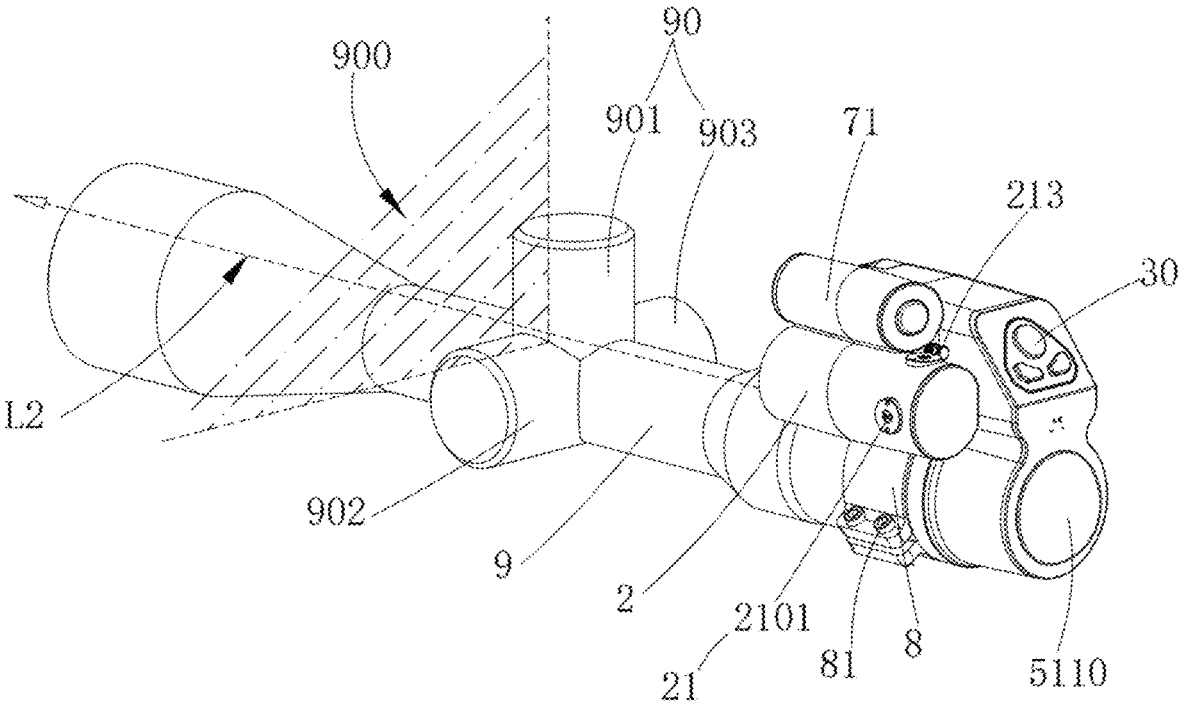
FIG. 1 is a structural view of an aiming assistance device mounted on an optical sight according to some embodiments of the present disclosure.

Wherein:

1—observation member; 11—observation tube;
2—detection mechanism; 20—detection body; 200—detection ball head; 201—adjustment tail; 2010—bearing face; 2011—first force—bearing face; 2012—second force—bearing face; 2013—stepped mounting hole; 21—leveling assembly; 210—leveling knob; 2100—spherical portion; 2101—fine adjustment portion; 211—elastic bearing member; 2110—connecting tube; 2111—support rod; 2111a—limiting platform; 2112—compression spring; 213—fine adjustment rod; 22—emitter; 23—receiver; 24—visible laser emitter;
3—display; 30—operation button;

4—light deflection module; 40—deflection member; 41—total reflection member;

5—housing; 5a—mounting barrel; 5a1—slot; 5b—connecting plate; 50—L-shaped slot; 51—first accommodating cavity; 510—connection port; 5100—fully transparent lens; 511—observation port; 5110—observation lens; 512—connecting port; 52—second accommodating cavity; 521—first mounting end; 522—second mounting end; 53—third accommodating cavity; 530—opening; 531—first wire hole; 54—fourth accommodating cavity; 540—second wire hole; 55—accommodating recess; 550—positioning ball head; 56—receiving hole;

6—coupling lens assembly; 60—mounting barrel; 600—threaded hole; 61—sleeve; 610—threaded portion; 611—adjustment portion; 6110—gear slot; 62—dioptric spherical lens;

71—power supply module; 72—adjustment rod; 720—gear end; 721—handwheel end; 7210—positioning groove; 73—sealing ring;

8—external ring; 80—connection protrusion; 81—locking bolt;

9—lens barrel; 90—adjustment handwheel; 900—gap area; 901—upper handwheel; 902—left handwheel; 903—right handwheel; 91—objective lens; 92—eyepiece;

L1—external light; L2—detection ray; L2'—reflected light of the detection ray; L3—axis of the lens barrel; L4—display light; L5—angle bisector;

α—vertical included angle;

D1—distance between the detection ray and the axis of the lens barrel; D2—maximum distance between the adjustment handwheel and the axis of the lens barrel; D3—minimum distance between the adjustment handwheel and the axis of the lens barrel.

DETAILED DESCRIPTION

The following describes some non-limiting exemplary embodiments of the disclosure with reference to the accompanying drawings. The described embodiments are merely a part rather than all of the embodiments of the disclosure. All other embodiments obtained by a person of ordinary skill in the art based on the embodiments of the disclosure shall fall within the scope of the disclosure.

Unless otherwise defined, all technical and scientific terms used herein have the same meaning as commonly understood by one of ordinary skill in the art to which this invention belongs. The terms used in the description of the application herein are only for the purpose of describing specific embodiments and are not intended to limit the present disclosure. The terms "comprising" and "having" and any variations thereof in the description and claims of the present disclosure and the above description of the accompanying drawings are intended to cover non-exclusive inclusion. The terms "first," "second," etc., in the description and claims of the present disclosure or the above accompanying drawings are used to distinguish different objects, not to describe a specific order.

The reference to "embodiment" herein means that a particular feature, structure, or characteristic described in connection with the embodiment may be included in at least one embodiment of the present disclosure. The appearance of the phrase in various places in the description is not necessarily all referring to the same embodiment, nor is it an independent or alternative embodiment that is mutually exclusive with other embodiments. It is explicitly and implicitly understood by those skilled in the art that the embodiments described herein may be combined with other embodiments.

In order to enable those skilled in the art to better understand the solutions of the present disclosure, the technical solutions in the embodiments of the present disclosure will be described clearly and completely with reference to the accompanying drawings.

Figure 2:
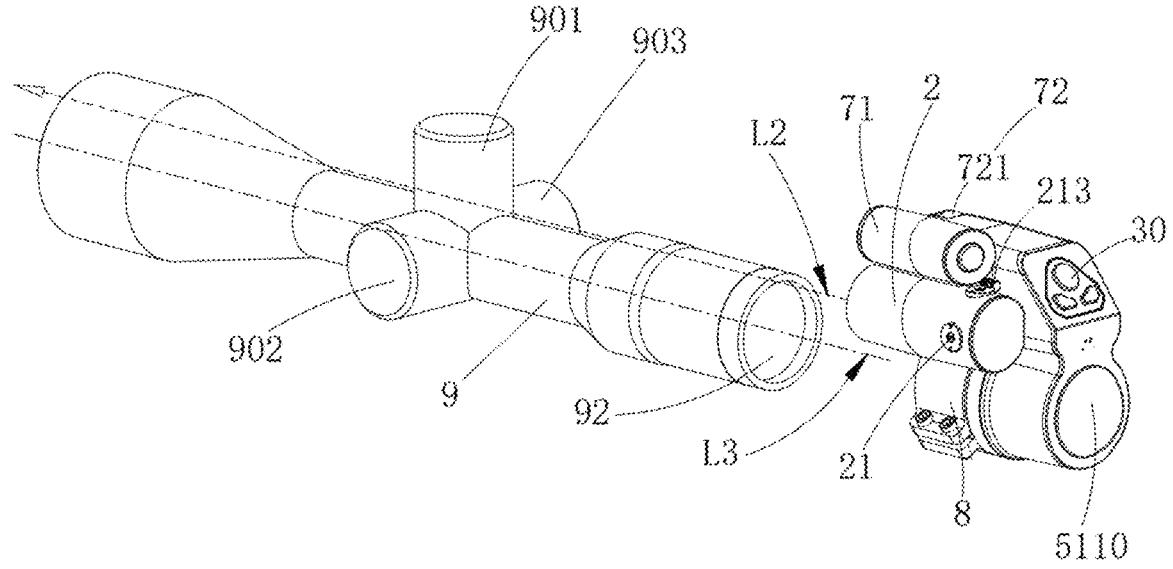
FIG. 2 is a structural view of the aiming assistance device separated from the optical sight according to some embodiments of the present disclosure.
Figure 3:
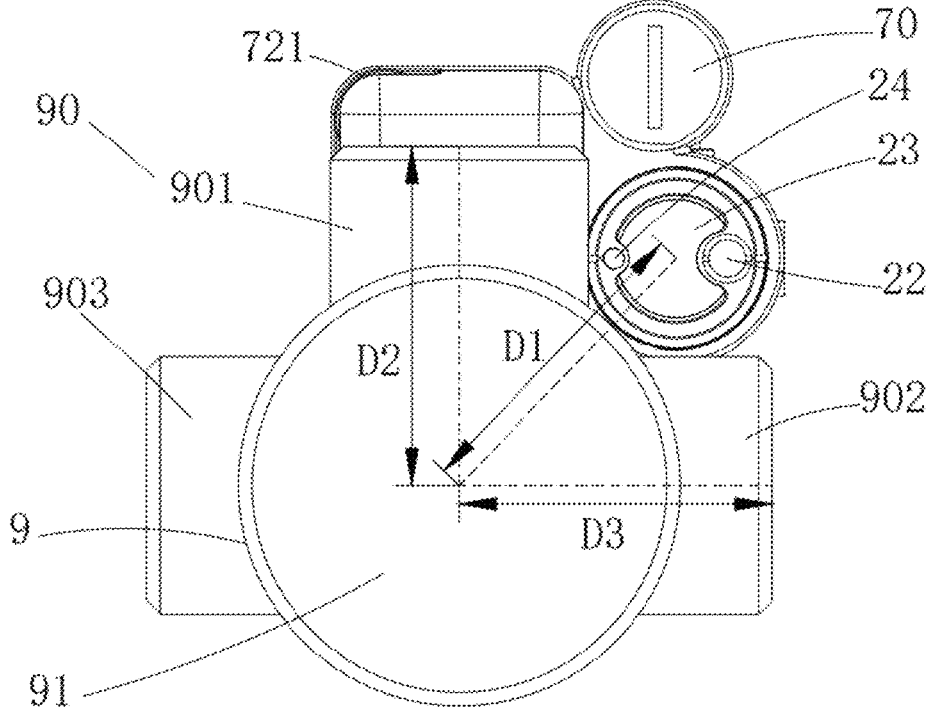
FIG. 3 is a front projection view of the aiming assistance device mounted on the optical sight according to some embodiments of the present disclosure.

Referring to FIGS. 1-14, the present disclosure provides an aiming assistance device, to be used with an optical sight. The optical sight may include a lens barrel 9 and a plurality of adjustment handwheels 90 protruding from an outer wall of the lens barrel 9. A gap area 900 may be formed between any two adjacent adjustment handwheels 90. For case of description, a structure of the optical sight may be further elaborated. As shown in FIGS. 1-3, a front end of the lens barrel 9 may be arranged with an objective lens 91, and a rear end of the lens barrel 9 may be arranged with an eyepiece 92. That is, the front end of the lens barrel 9 may face an object, and the rear end of the lens barrel 9 may be close to a human eye. An external light L1 may pass through the objective lens 91 and enters the lens barrel 9, and finally pass through the eyepiece 92. The optical sight may be arranged with three adjustment handwheels 90, which may include an upper handwheel 901, a left handwheel 902, and a right handwheel 903. The gap area 900 may be formed between the upper handwheel 901 and the left handwheel 902, or between the upper handwheel 901 and the right handwheel 903.

Based on the structure of the optical sight described above, as shown in FIGS. 1-7, the aiming assistance device may include a detection mechanism 2, a display 3, and a light deflection module 4. The detection mechanism 2 may emit a detection ray L2 to obtain measurement information, and the detection ray L2 may pass through the gap area 900. The display 3 may emit a display light L4 containing the measurement information, and the light deflection module 4 may reflect the display light L4, and the external light L1 may pass through the light deflection module 4.

Specifically, the detection mechanism 2 may be roughly cylindrical, an axis of the detection mechanism 2 may be parallel to an axis of the lens barrel 9, and the axis of the detection mechanism 2 may pass through the gap area 900, and the axis of the detection mechanism 2 may roughly coincide with the emitted detection ray L2.

In some embodiments, a distance D1 between the detection ray L2 and an axis L3 of the lens barrel 9 may be less than a maximum distance D2 between the adjustment handwheels 90 and the axis L3 of the lens barrel 9, so that after the aiming assistance device is mounted on the optical sight, a height of the detection mechanism 2 protruding from the lens barrel 9 may be less than a maximum height of the adjustment handwheels 90 protruding from the lens barrel 9, so as to make an overall structure of the optical sight equipped with the aiming assistance device more compact and an overall volume of the optical sight equipped with the aiming assistance device smaller, and also to make the detection ray L2 closer to the axis L3 of the lens barrel 9, so as to improve an accuracy of the measurement information obtained by the detection mechanism 2 to conform to real information of an object seen in the lens barrel 9. Particularly, the distance D1 between the detection ray L2 and the axis L3 of the lens barrel 9 may be less than a minimum distance D3 between the adjustment handwheels 90 and the axis L3 of the lens barrel 9, so that the height of the detection mechanism 2 protruding from the lens barrel 9 may be less than a minimum height of the adjustment handwheel s90 protruding from the lens barrel 9, which may further make the overall structure of the optical sight equipped with the aiming assistance device more compact and the overall volume smaller. It should be noted that a distance between the adjustment handwheel 90 and the axis L3 of the lens barrel 9 may specifically refer to a distance between a far end of the adjustment handwheel 90 protruding from the lens barrel 9 and the axis L3 of the lens barrel 9. Moreover, in addition to the above limitations, the distance D1 between the detection ray L2 and the axis L3 of the lens barrel 9 may also need to be greater than a maximum outer diameter of the lens barrel 9 (such as an outer diameter at the objective lens 91), so as to prevent the detection ray L2 from being blocked by an outer wall of the lens barrel 9 at the objective lens 91.

Figure 13:
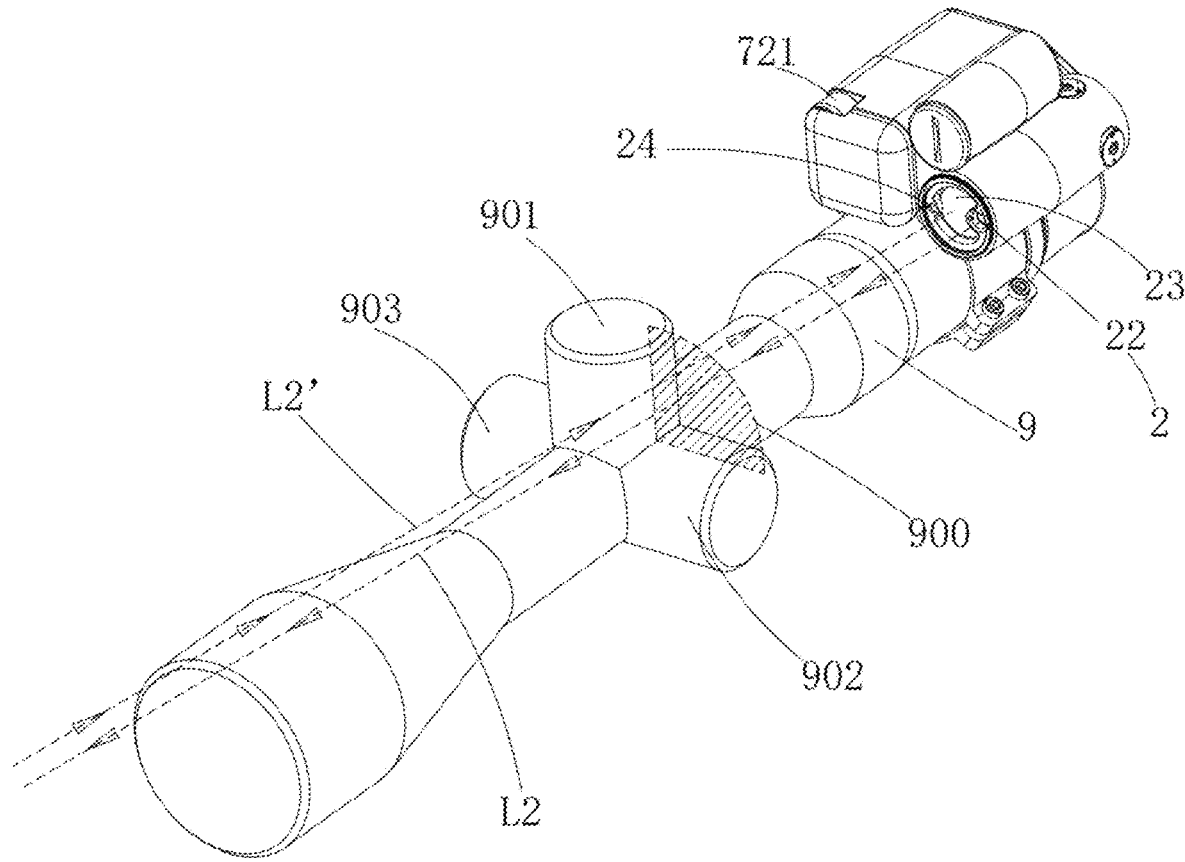
FIG. 13 is a schematic view of a detection ray and a reflected light of a detection mechanism according to some embodiments of the present disclosure, with both a receiver and an emitter in a third accommodating cavity.

For optical sights of different specifications or sizes, the gap area 900 may have different definitions. Taking the upper handwheel 901 and the left handwheel 902 as an example, in some embodiments, the gap area 900 may be defined as an open area as shown in FIG. 1, and radial boundaries of the open area may be formed by a ray of a contour line of the left handwheel 902 and a ray of a contour line of the upper handwheel 901, and the open area may have no boundary in a circumferential direction. In some embodiments, the gap area 900 may also be defined as a closed sector area as shown in FIG. 13. In this case, a radius of the gap area 900 may be equal to a size of the upper handwheel 901 or a size of the left handwheel 902 protruding from the outer wall of the lens barrel 9. Specifically, the size of the left handwheel 902 with a smaller protruding size may be selected as the radius of the gap area 900. In short, the gap area 900 described in the present disclosure may be not limited to a specific geometric shape, and an essence of the gap area 90 may be an area between two adjacent adjustment handwheels 90 where the detection ray L2 may pass through without being blocked, and a range of this area may be dynamically determined by actual contours and relative positions of the adjustment handwheels 90.

Specifically, the detection mechanism 2 may be electrically connected to the display 3, so that the measurement information obtained by the detection mechanism 2 may be sent to the display 3. The display 3 may emit a display light L4 containing the measurement information towards the light deflection module 4. The light deflection module 4 may be arranged with at least one reflective mirror for reflecting the display light L4. The light deflection module 4 may be also arranged with a transmissive lens or a hollow area through which the external light L1 may pass. When the aiming assistance device is mounted on the optical sight, the transmissive lens or hollow area of the light deflection module 4 may be distributed at the rear end of the lens barrel 9. When the human eye is positioned at a rear end of the transmissive lens or hollow area of the light deflection module 4, both the external light L1 passing through the light deflection module 4 and the display light L4 which is reflected may be obtained, and then an image of a distant target obtained through the lens barrel 9 and an image containing the measurement information may be formed in the human eye.

The detection mechanism 2 may be generally an infrared rangefinder, which may obtain the measurement information by emitting and receiving corresponding detection rays L2, so that the measurement information may include at least a distance between a user and a target object obtained by the infrared rangefinder. It also needs to be noted that various sensors may also be mounted on the aiming assistance device, so that the measurement information may also include wind speed, temperature, humidity, and so on. When the aiming assistance device is mounted at the rear end of the lens barrel 9, a projection of the detection mechanism 2 along an axial direction of the lens barrel 9 may overlap with the gap area 900, so that the detection ray L2 may pass through the gap area 900, and a distance between the detection ray L2 and the axis L3 of the lens barrel 9 may be less than the maximum distance D2 between the adjustment handwheel 90 and the axis L3 of the lens barrel 9, so that a height of the detection mechanism 2 radially protruding from the outer wall of the lens barrel 9 may be less than a height of the adjustment handwheel 90 radially protruding from the outer wall of the lens barrel 9, which effectively reducing a size of the detection mechanism 2 radially protruding from the lens barrel 9, making the overall volume of the optical sight equipped with the aiming assistance device smaller, and may be convenient for the user to carry. When the optical sight equipped with the aiming assistance device is applied to a firearm, since the overall volume is small, a height of a center of gravity of a firearm system may be reduced, which may be conducive to improving shooting stability of the firearm, and a smaller distance between the detection ray L2 and the axis L3 of the lens barrel 9 may further reduce an error of the measurement information obtained by the detection mechanism 2 and improve measurement accuracy of the detection mechanism 2. The light deflection module 4 may merge the display light L4 containing the measurement information and the external light L1 of a distant target object obtained by the optical sight, an image of the optical sight and an image containing the measurement information may be displayed on a same screen, which may reduce ranging process and improve ranging efficiency.

In addition, the detection mechanism 2 may be spaced apart from the adjustment handwheels 90 along an axial direction of the lens barrel 9, and the detection mechanism 2 may be arranged at an end of the lens barrel 9 where the eyepiece 92 is located, which is convenient for the user to operate. In other embodiments, the detection mechanism 2 may also be arranged at any position along the axial direction of the lens barrel 9, so that the detection ray L2 of the detection mechanism 2 is not blocked by the adjustment handwheel 90.

Figure 5:
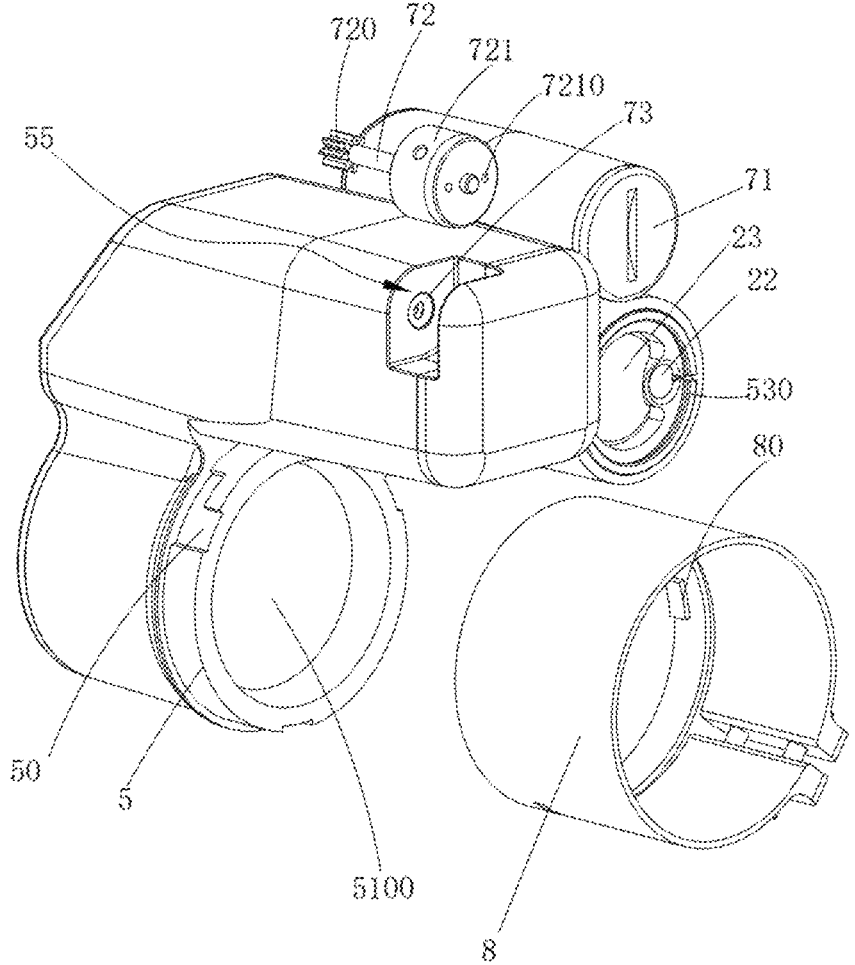
FIG. 5 is another schematic view of the overall structure of the aiming assistance device according to some embodiments of the present disclosure, with an external ring separated from a housing.
Figure 6:
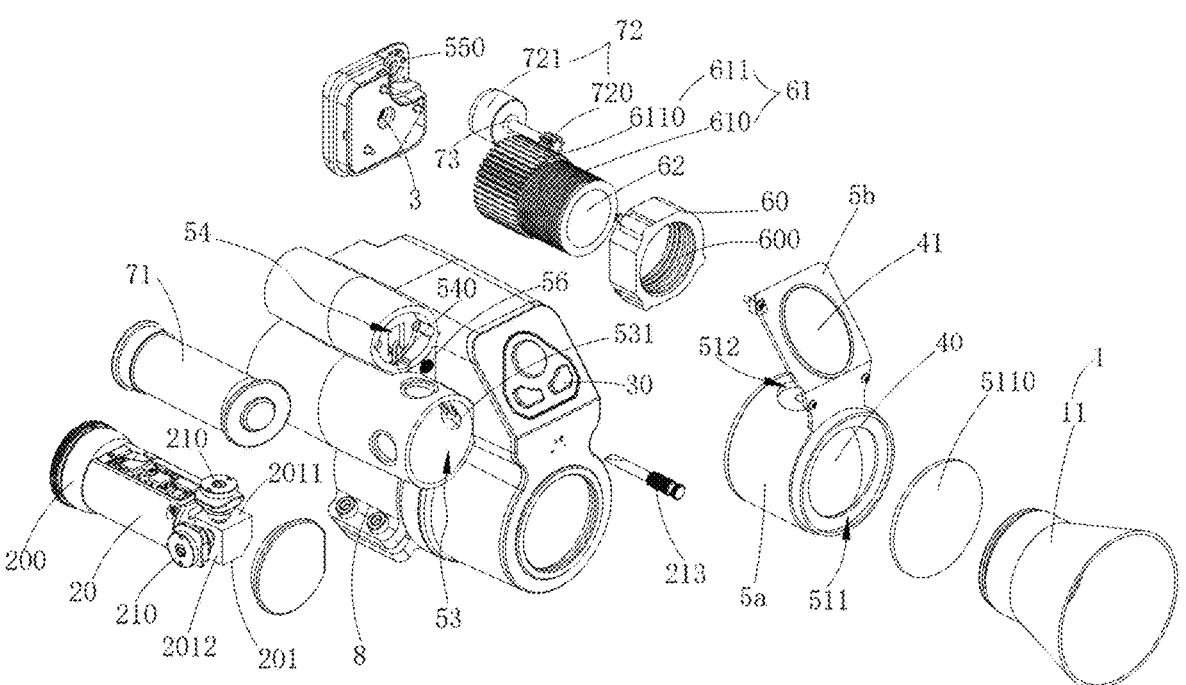
FIG. 6 is an exploded view of the aiming assistance device according to some embodiments of the present disclosure.

Referring to FIG. 6, in some embodiments, the aiming assistance device may also include a housing 5. The housing 5 may be detachably connected to the lens barrel 9. The housing 5 may house the display 3, the light deflection module 4, and the detection mechanism 2. Specifically, the housing 5 may define a plurality of cavities to receive and secure the display 3, the light deflection module 4, and the detection mechanism 2, so that the overall structure of the aiming assistance device may be compact, and an all-round covering of the housing 5 may seal an internal structure of the housing 5, which may have an effect of dust prevention and water resistance. As shown in FIG. 5, the aiming assistance device may further include an external ring 8, and a plurality of L-shaped slots 50 may be formed on a circumferential outer wall of a front end of the housing 5, and an inner wall of the external ring 8 may be arranged with a plurality of connection protrusions 80 matched with the L-shaped slots 50. The external ring 8 may be connected to the housing 5 through an engagement of each of the connection protrusions 80 in a respective one of the L-shaped slots 50. The external ring 8 may also be arranged with a locking bolt 81. When the external ring 8 is sleeved on the rear end of the lens barrel 9, the external ring 8 may be locked to the outer wall of the lens barrel 9 through the locking bolt 81, and thereby the housing 5 may be mounted at the rear end of the lens barrel 9. Different sizes of adapter tubes may be arranged between the external ring 8 and the rear end of the lens barrel 9 to adapt to eyepieces of various sizes of different lens barrels 9. In other embodiments, the housing 5 and the external ring 8 may be integrally formed as a one-piece structure.

Figure 7:
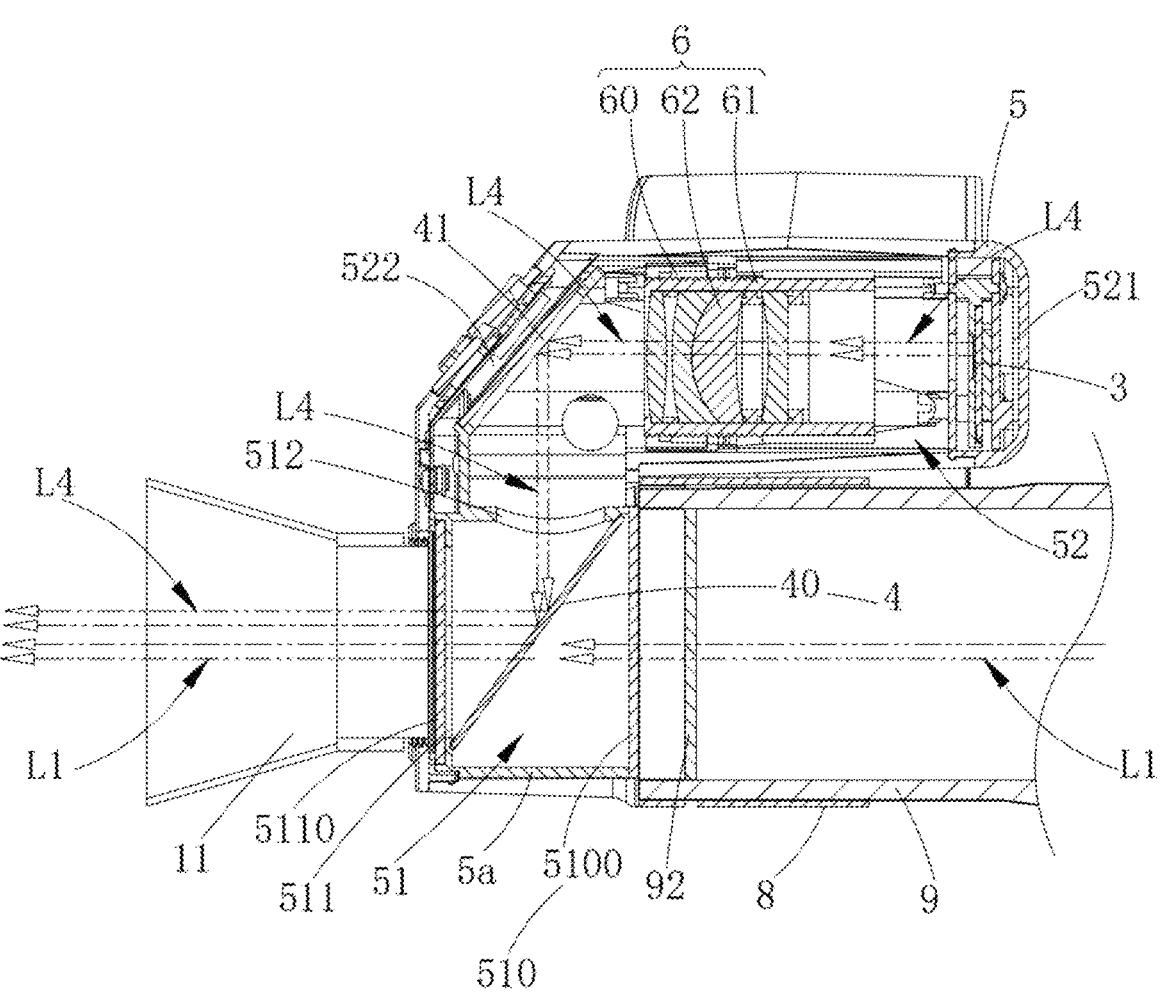
FIG. 7 is a cross-sectional view of the aiming assistance device according to some embodiments of the present disclosure.
Figure 8:
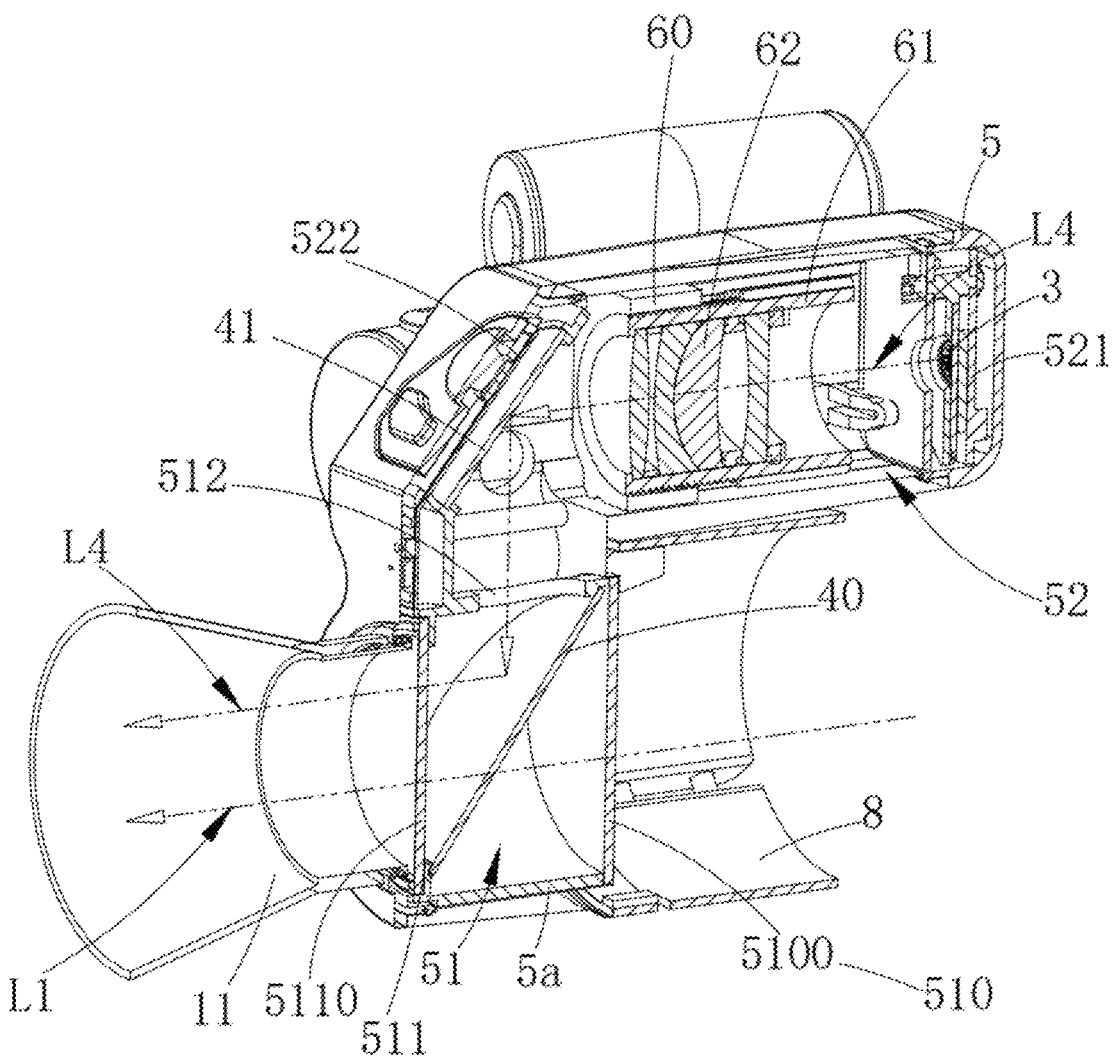
FIG. 8 is a three-dimensional cross-sectional view of the aiming assistance device according to some embodiments of the present disclosure.

Referring to FIGS. 7 and 8, in some embodiments, the housing 5 may define a first accommodating cavity 51 and a second accommodating cavity 52 that may be communicated to each other. The first accommodating cavity 51 may have an observation port 511 and a connection port 510 which may be formed opposite each other. The observation port 511 may be for the user to obtain a merged image in the first accommodating cavity 51. The housing 5 may be connected to the lens barrel 9 at the connection port 510. The light deflection module 4 may be arranged in the first accommodating cavity 51 and/or the second accommodating cavity 52, and the display 3 may be arranged in the second accommodating cavity 52. Specifically, the first accommodating cavity 51 may be coaxially formed at the rear end of the lens barrel 9, and the connection port 510 may be close to the eyepiece 92 of the lens barrel 9, and the observation port 511 may be for the user to observe and obtain a corresponding image. The external light L1 may pass through the objective lens 91, a body of the lens barrel 9, the eyepiece 92, the first accommodating cavity 51, and the observation port 511 in sequence, the user may observe the external light L1 by positioning an eye at the observation port 511, and the external light L1 may finally form an image in the eye. It should be noted that during use, the eye should be positioned behind the observation port 511 and ensure that the eye may maintain a certain distance from the observation port 511 to prevent the observation port 511 from hitting the eye due to an external force.

The display 3 may be fixed at an end of the second accommodating cavity 52 away from the first accommodating cavity 51, and the light deflection module 4 may be arranged in the first accommodating cavity 51 or in both the first accommodating cavity 51 and the second accommodating cavity 52. A length direction of the first accommodating cavity 51 is roughly parallel to, at a small angle to a length direction of the lens barrel 9. A length direction of the second accommodating cavity 52 is roughly parallel to the length direction (axial direction) of the lens barrel 9, the first accommodating cavity 51 and the second accommodating cavity 52 may roughly form a bent L-shaped cavity, and the second accommodating cavity 52 may be formed along the axial direction of the lens barrel 9 and may be located behind the upper handwheel 901, so that the display light L4 emitted by the display 3 may be roughly parallel to or at a small angle to the external light L1 passing through the lens barrel 9. The light deflection module 4 may include at least two lenses. Specifically, a reflective lens that may reflect the display light L4 may be arranged at the end of the second accommodating cavity 52 away from the display 3, and a semi-reflective semi-transparent lens, a beam splitter, a prism, or other lenses that may not block the external light L1 passing through the lens barrel 9 may be arranged in the first accommodating cavity 51, and this lens may continue to reflect the display light L4 after the display light L4 has been reflected by the reflective lens in the second accommodating cavity 52, so that the display light L4 may pass through the observation port 511 after being reflected by the two lenses. The external light L1 passing through the lens barrel 9 may be not blocked by the lens of the light deflection module 4 arranged in the first accommodating cavity 51 and may pass through the observation port 511, so that the user can simultaneously obtain the display light L4 and the external light L1. This arrangement may make a radial protrusion size of the second accommodating cavity 52 on the outer wall of the lens barrel 9 smaller, make the overall volume of the aiming assistance device smaller, and make the aiming assistance device or the optical sight with the aiming assistance device equipped convenient to carry.

In other embodiments, when each of the length direction of the first accommodating cavity 51 and the length direction of the second accommodating cavity 52 is roughly perpendicular to or at a large angle to the length direction of the lens barrel 9, in other words, the first accommodating cavity 51 and the second accommodating cavity 52 roughly present radially parallel straight-tube-shaped cavities, so that the display light L4 emitted by the display 3 and the external light L1 passing through the lens barrel 9 may form a certain angle relative to each other. The light deflection module 4 may include at least one lens, which may be specifically a semi-reflective semi-transparent lens, a beam splitter, a prism, or other lenses that allow the external light L1 passing through the lens barrel 9 to pass through, and this lens can also reflect the display light L4 emitted by the display 3. In this case, the display light L4 may pass through the second accommodating cavity 52 and then reach the first accommodating cavity 51, and may be reflected by the lens of the light deflection module 4 and pass through the observation port 511. The external light L1 passing through the lens barrel 9 may be not blocked by the lens of the light deflection module 4 arranged in the first accommodating cavity 51 and may pass through the observation port 511, so that the user may simultaneously obtain the display light L4 and the external light L1. This layout uses fewer reflective lenses to reflect the display light L4 to the observation port 511, and the cost may be lower.

Referring to FIGS. 7 and 8, in some embodiments, the light deflection module 4 may include a deflection member 40, the deflection member 40 may be arranged obliquely in the first accommodating cavity 51, and the deflection member 40 may be arranged between the observation port 511 and the connection port 510. The deflection member 40 may reflect the display light L4 so that the display light L4 may pass through the observation port 511, and the deflection member 40 may allow the external light L1 passing through the lens barrel 9 to pass through. The deflection member 40 may specifically be a semi-reflective semi-transparent lens, a beam splitter, or a prism, so that the deflection member 40 may reflect the display light L4 without blocking the external light L1. Specifically, the deflection member 40 may diagonally divide the first accommodating cavity 51 into two halves, and a space formed by the deflection member 40 and the observation port 511 may allow the display light L4 to enter, so that the display light L4 may be reflected to the observation port 511 by the deflection member 40. During use, the display light L4 emitted by the display 3 may be incident on the deflection member 40 and may be reflected by the deflection member 40, and the external light L1 passing through the lens barrel 9 may shoot towards the deflection member 40 and pass through the deflection member 40, so that the display light L4 containing the measurement information and the external light L1 containing the target image information may be merged at the deflection member 40, which may realize an emerging of the optical sight image and the measurement information image, so that the user may see an image of the optical sight through the observation port 511 and at the same time may see the measurement information such as a distance to the target object, wind speed, temperature, humidity, as well as an auxiliary information of functional modules such as a trajectory, level, and angle meter. In other embodiments, an area of the deflection member 40 may be smaller, so that the deflection member 40 may not completely divide the first accommodating cavity 51. In this case, the deflection member 40 may reflect the display light L4, and a portion of the first accommodating cavity 51 without the deflection member 40 may form a hollow, so that the external light L1 passing through the lens barrel 9 may pass through and may finally shoot towards the observation port 511.

Referring to FIG. 7, in some embodiments, the second accommodating cavity 52 may include a first mounting end 521 and a second mounting end 522 that may be away from each other, and the second mounting end 522 may be close to and communicated with the first accommodating cavity 51. The display 3 may be fixed at the first mounting end 521. Specifically, the second accommodating cavity 52 may be a slender cylindrical cavity, and each of the first mounting end 521 and the second mounting end 522 may be a respective one of two ends of the second accommodating cavity 52 in a length direction of the second accommodating cavity 52, and the length direction of the second accommodating cavity 52 may be roughly parallel to the axis L3 of the lens barrel 9. As shown in FIG. 7, the first accommodating cavity 51 and the second accommodating cavity 52 may roughly form an L-shaped cavity. When the aiming assistance device is mounted at the rear end of the lens barrel 9, the second accommodating cavity 52 may be located behind the upper handwheel 901. By reasonably utilizing an axial free space of the lens barrel 9, a size of the second accommodating cavity 52 radically protruding from the outer wall of the lens barrel 9 may be made smaller, which may significantly reduce the overall volume of the optical sight equipped with the aiming assistance device. Based on the above structure, the light deflection module 4 may also include a total reflection member 41, the total reflection member 41 may be arranged obliquely at the second mounting end 522, and the display light L4 may be reflected to the deflection member 40 by the total reflection member 41. Specifically, each of the total reflection member 41 and the deflection member 40 may be arranged obliquely, and the total reflection member 41 and the deflection member 40 may be arranged facing each other, so that the display light L4 may be reflected to the deflection member 40 by the total reflection member 41. Due to an axial arrangement of the second accommodating cavity 52, the display light L4 from the display 3 may be directed axially towards the total reflection member 41 at the second mounting end 522, so that the reflected display light L4 may further be directed to the deflection member 40, and may be finally reflected to the observation port 511 by the deflection member 40. Through the total reflection member 41 and the deflection member 40, both the display light L4 emitted by the display 3 and the external light L1 passing through the lens barrel 9 may be directed to the observation port 511, so that the user's eye may simultaneously obtain the display light L4 and the external light L1, and at the same time obtain the image of the distant target of the optical sight and the image of the measurement information.

Figure 9:
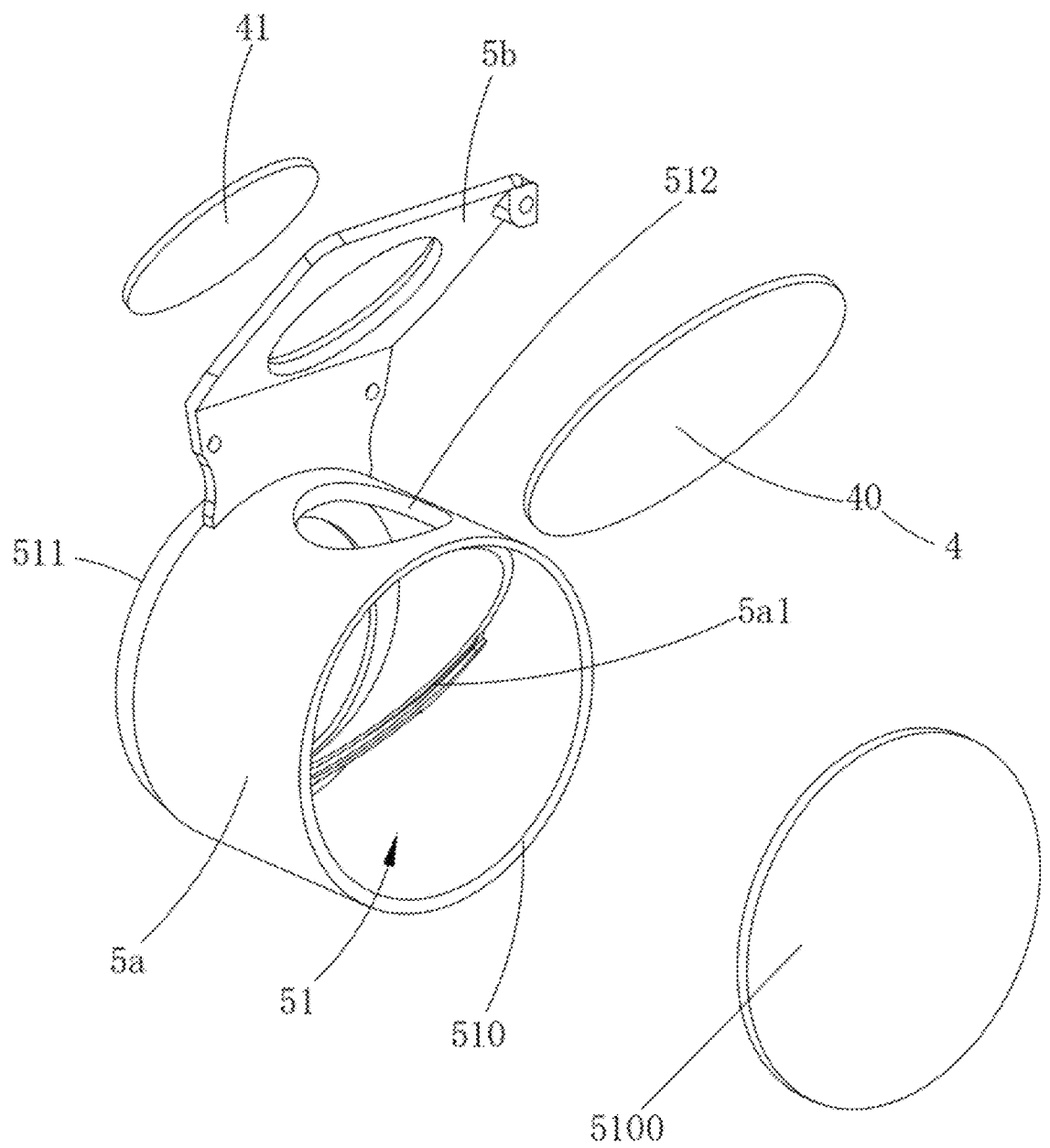
FIG. 9 is a structural view of a mounting barrel and a light deflection module according to some embodiments of the present disclosure, with the mounting barrel and the light deflection module separated from each other.
Figure 10:
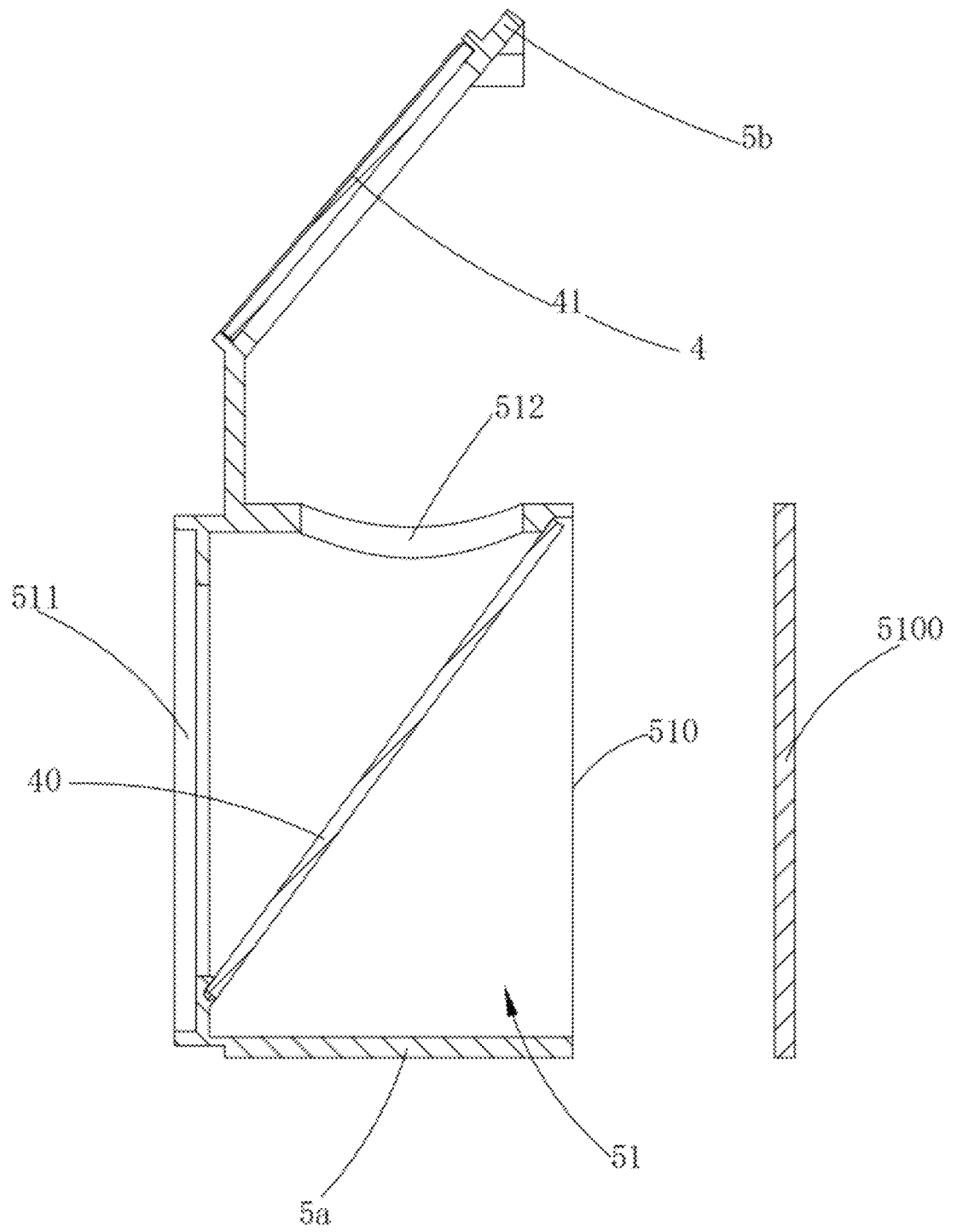
FIG. 10 is a cross-sectional view of the mounting barrel and the light deflection module according to some embodiments of the present disclosure.

In order to facilitate mounting of the total reflection member 41 and the deflection member 40 to an interior of the housing 5, the housing 5 may also include a mounting barrel 5a and a connecting plate 5b extending radially along the mounting barrel 5a. As shown in FIGS. 8 and 9, the mounting barrel 5a may be an internal structure of the housing 5, and the first accommodating cavity 51 may be formed in the mounting barrel 5a. An inner wall of the mounting barrel 5a may define an inclined slot 5a1, and the deflection member 40 may be inserted in the inclined slot 5a1. The connecting plate 5b may extend to the second mounting end 522 of the second accommodating cavity 52, and the total reflection member 41 is fixed on the connecting plate 5b. Specifically, each of two ends of the mounting barrel 5a may be opened, and each of the connection port 510 and the observation port 511 of the first accommodating cavity 51 may be formed at a respective one of the two ends of the mounting barrel 5a. The mounting barrel 5a may be connected with the lens barrel 9 at the connection port 510. In addition, a side wall of the mounting barrel 5a may define a connecting port 512 that may be communicated to the second accommodating cavity 52, so that the display light L4 reflected by the total reflection member 41 may enter the first accommodating cavity 51 through the connecting port 512. The connecting plate 5b may be arranged with an inclined mounting face, and the total reflection member 41 may be fixed on the inclined mounting face. In actual production, the total reflection member 41 may be mounted on the inclined mounting face, the deflection member 40 may be mounted in the inclined slot 5a1, and finally the mounting barrel 5a with the connecting plate 5b may be placed in the housing 5. It should be noted that as long as it may be ensured that the display light L4 incident on the total reflection member 41 may be reflected on the deflection member 40, an inclined angle of the inclined slot 5a1 may be the same as or different from an inclined angle of the inclined mounting face on the connecting plate 5b. In order to ensure that internal components of the housing 5 are not contaminated by dust and rain, a fully transparent lens 5100 may also be mounted at the connection port 510 to close the connection port 510 without obstructing the external light L1 passing through the lens barrel 9. An observation lens 5110 may also be mounted at the observation port 511 to close the observation port 510 without obstructing the user from obtaining the external light L1 and the display light L4.

Referring to FIGS. 6 and 7, in some embodiments, the aiming assistance device may further include a coupling lens assembly 6, the coupling lens assembly 6 may be located between the display 3 and the light deflection module 4, and may adjust imaging clarity of the display 3. Specifically, the coupling lens assembly 6 may include a plurality of spherical lenses. By changing a distance between the coupling lens assembly 6 and the display 3, a diopter of the display light L4 may be adjusted, so that users with different visions may all obtain a clear image containing measurement information during use.

Referring to FIGS. 6 and 7, the coupling lens assembly 6 may include a mounting barrel 60, a sleeve 61 with a passage extending between two opposing ends of the sleeve 61, and at least one dioptric spherical lens 62 arranged in the sleeve 61. The mounting barrel 60 may be fixed in the second accommodating cavity 52, the sleeve 61 may be movably arranged, and the at least one dioptric spherical lens 62 may be located between the display 3 and the total reflection member 41. Driving the sleeve 61 to move may change a distance between the dioptric spherical lens 62 and the display 3. Specifically, the display light L4 emitted by the display 3 may pass through the at least one dioptric spherical lens 62 and may be then reflected to the deflection member 40 by the total reflection member 41, and finally reflected to the observation port 511 by the deflection member 40. By adjusting the distance between the dioptric spherical lens 62 and the display 3, the imaging clarity in the human eye may be changed. In addition, a plurality of dioptric spherical lenses 62 may be mounted in the sleeve 61, and the dioptric spherical lenses 62 may have a characteristic of a uniform focal plane. The dioptric spherical lenses 62 may be arranged in the sleeve 61 to avoid direct contact between the dioptric spherical lenses 62 and an external adjustment member, and to avoid contamination of the dioptric spherical lenses 62. By driving a movement of the sleeve 61 to change a distance between the plurality of dioptric spherical lenses 62 and the display 3, clarity of a final image containing the measurement information in the human eye may be changed to be suitable for users with different visions. In other embodiments, at least one dioptric spherical lens 62 may also be located between the display 3 and the deflection member 40. When the length direction of the second accommodating cavity 52 is roughly perpendicular to the length direction of the lens barrel 9, the display light L4 emitted by the display 3 may be directly directed to the deflection member 40. In this case, the total reflection member 41 may not be arranged, and the display light L4 emitted by the display 3 may pass through at least one dioptric spherical lens 62 and then may be directly directed to the deflection member 40, and may be finally reflected to the observation port 511 by the deflection member 40.

In order to improve stability of the sleeve 61 during rotation, in some embodiments, the mounting barrel 60 may define a threaded hole 600, and the sleeve 61 may include a threaded portion 610 and an adjustment portion 611. The threaded portion 610 may be thread-connected to the mounting barrel 60 through the threaded hole 600, and the sleeve 61 may be rotated through the adjustment portion 611. An axial displacement of the sleeve 61 may be achieved by the thread connection, and the threaded manner may make structural stability of the sleeve 61 stronger and enable the distance between the dioptric spherical lens 62 and the display 3 to be more accurately adjusted. In other embodiments, a worm gear and worm or other rotary displacement structures may also be used. In other embodiments, a notch may be opened on the housing 5 to expose a part of the adjustment portion 611, and the user may touch and move the adjustment portion 611 to make the sleeve 61 rotate, thereby changing the distance between the dioptric spherical lens 62 and the display 3. In other embodiments, the sleeve 61 may be slidably arranged in the second accommodating cavity 52. An outer wall of the sleeve 61 may be square so that the sleeve 61 may only slide axially relative to the second accommodating cavity 52. A threaded hole may be opened in the sleeve 61, and a screw rod may be mounted on the housing 5. One end of the screw rod may enter the second accommodating cavity 52 and may be thread-connected to the sleeve 61 through the threaded hole. By controlling the other end of the screw rod exposed out of the second accommodating cavity 52, the sleeve 61 may slide in a direction away from or close to the display 3, thereby changing the distance between the dioptric spherical lens 62 and the display 3.

Referring to FIGS. 5 and 6, in some embodiments, the adjustment portion 611 may define a plurality of gear slots 6110 formed on an outer wall of the sleeve 61. The aiming assistance device may also include an adjustment rod 72, the adjustment rod 72 may be rotatably mounted on the housing 5, and the adjustment rod 72 may include a gear end 720 and a handwheel end 721. The gear end 720 may be arranged in the second accommodating cavity 52 and may be meshed with the gear slots 6110. The handwheel end 721 may be arranged out of the housing 5. Specifically, the plurality of gear slots 6110 may be distributed on the outer wall of the sleeve 61. Through a meshing of the gear end 720 and the gear slots 6110, when the user controls the rotation of the sleeve 61 through the handwheel end 721, the sleeve 61 may be prevented from large-scale rotation, and a fine and stable control of the sleeve 61 may be achieved.

Furthermore, an accommodating recess 55 for accommodating the handwheel end 721 may be formed on the outer wall of the housing 5. The handwheel end 721 may at least partially protrude from the accommodating recess 55 to facilitate the user to touch and move the handwheel end 721, and the accommodating recess 55 may make a size of the handwheel end 721 protruding from the housing 5 smaller. Moreover, this arrangement may reduce probability of the handwheel end 721 being hit by other items, and may reduce the overall volume of the aiming assistance device, making an overall structure of the aiming assistance device more compact. It should also be noted that in other embodiments, an outer wall of the handwheel end 721 may not protrude from the accommodating recess 55, while still permitting user's fingertip contact the outer wall of the handwheel end 721 through the accommodating recess 55 to facilitate the movement of the handwheel end 721.

Referring to FIG. 5 and FIG. 6, in some embodiments, an inner wall of the housing 5 for forming the accommodating recess 55 may be arranged with at least one positioning ball head 550, and an axial end wall of the handwheel end 721 may define at least one positioning slot 7210 matched with the positioning ball head 550. Specifically, two positioning ball heads 550 and two positioning slots 7210 may be provided. When the distance between the dioptric spherical lens 62 and the display 3 is a factory default distance, each of the two positioning ball heads 550 may be engaged in a respective one of the two positioning slots 7210 to improve stability of the adjustment rod 72 on the housing 5 and prevent the adjustment rod 72 from shaking or wobbling randomly. When the handwheel end 721 is actuated, the positioning ball heads 550 may be rotated out of the positioning slots 7210 and may abut against the inner wall for forming the accommodating recess 55 to form a transitional fit, which may make the rotation of the adjustment rod 72 more stable.

Referring to FIG. 5, in some embodiments, a sealing ring 73 may also be arranged at a connection position between the adjustment rod 72 and the housing 5. The sealing ring 73 may prevent external dust and rain from entering the second accommodating cavity 52 through a connection gap between the adjustment rod 72 and the housing 5, and prevent the internal display 3 and the dioptric spherical lens 62 from being contaminated. In addition, the arrangement of the sealing ring 73 may enable the second accommodating cavity 52 to be a closed, light-tight darkroom, so that the display light L4 may be not interfered with by an external light source, and clarity of the final image may be improved.

Referring to FIGS. 4, 5, 6 and 7, in some embodiments, the aiming assistance device may further include an observation member 1, which may include an observation tube 11. One end of the observation tube 11 may be connected to the observation port 511, and the other end of the observation tube 11 may be away from the housing 5. The observation tube 11 may be in a shape of a conical tube. An end of the observation tube 11 with a smaller diameter may be connected to the housing 5 at the observation port 511, and an end of the observation tube 11 with a larger diameter may be for the human eye to observe. The observation tube 11 may help the user to block other light at the human eye, reduce light interference to the user, and improve the user's visibility. During use, when the user positions the eye in a visible area of the observation tube 11, both the display light L4 and the external light L1 passing through the lens barrel 9 may be obtained by the eye at the same time, and then the image containing the measurement information and a distant target image obtained through the lens barrel 9 may be formed in the eye.

Referring to FIG. 6, in some embodiments, the housing 5 may also define a third accommodating cavity 53. A front end of the third accommodating cavity 53 may have an opening 530, the detection mechanism 2 may be mounted in the third accommodating cavity 53, and the detection ray L2 may pass through the opening 530. Specifically, the third accommodating cavity 53 may be formed next to the second accommodating cavity 52, and a projection of the third accommodating cavity 53 along an axial direction of the third accommodating cavity 53 may overlap with the gap area 900, so that the detection ray L2 emitted by the detection mechanism 2 mounted in the third accommodating cavity 53 may pass through the gap area 900 without being blocked by the adjustment handwheel 90. The third accommodating cavity 53 may have a first wire hole 531 at a position away from the opening 530. The first wire hole 531 may be communicated with the second accommodating cavity 52 and the third accommodating cavity 53, so that wires used to connect various components inside the housing 5 may be distributed between the second accommodating cavity 52 and the third accommodating cavity 53 through the first wire hole 531, so as to transmit the measurement information of the detection mechanism 2 to the display 3. It should also be noted that there may be no clear boundary among the first accommodating cavity 51, the second accommodating cavity 52, and the third accommodating cavity 53. In other embodiments, any two or three of the first accommodating cavity 51, the second accommodating cavity 52, and the third accommodating cavity 53 may be completely communicated with each other to form two or a single accommodating space that may accommodate various components.

With reference of FIGS. 3, 5, 13, and 14, the detection mechanism 2 may include a transmitter 22 and a receiver 23. The transmitter 22 may be located in the third accommodating cavity 53 and may emit the detection ray L2 through the opening 530. The receiver 23 may receive a reflected light L2' of the detection ray L2. Specifically, the detection mechanism 2 may be an infrared rangefinder, and the detection ray L2 emitted by the transmitter 22 may be an infrared ray. The receiver 23 may be a sensor capable of receiving a corresponding infrared ray. The transmitter 22 may emit the detection ray L2 towards a target object, which may be then reflected by the target object. The reflected light L2' of the detection ray L2 may be directed to the receiver 23, and after being processed by the detection mechanism 2, the measurement information may be transmitted to the display 3.

Referring to FIGS. 3, 5, 13, and 14, the receiver 23 may be arranged in different positions to receive the reflected light L2' of the detection ray L2.

As shown in FIGS. 3, 5, and 13, in some embodiments, the receiver 23 may be located in the third accommodating cavity 53. Since the third accommodating cavity 53 is located behind the gap area 900, the detection ray L2 emitted by the transmitter 22 may pass through the gap area 900 to the target object, and the reflected light L2' of the detection ray L2 may pass through the gap area 900 to the receiver 23. This arrangement may be beneficial for integrating the receiver 23 and the transmitter 22 in a single cavity, which may be convenient for production and maintenance.

Figure 14:
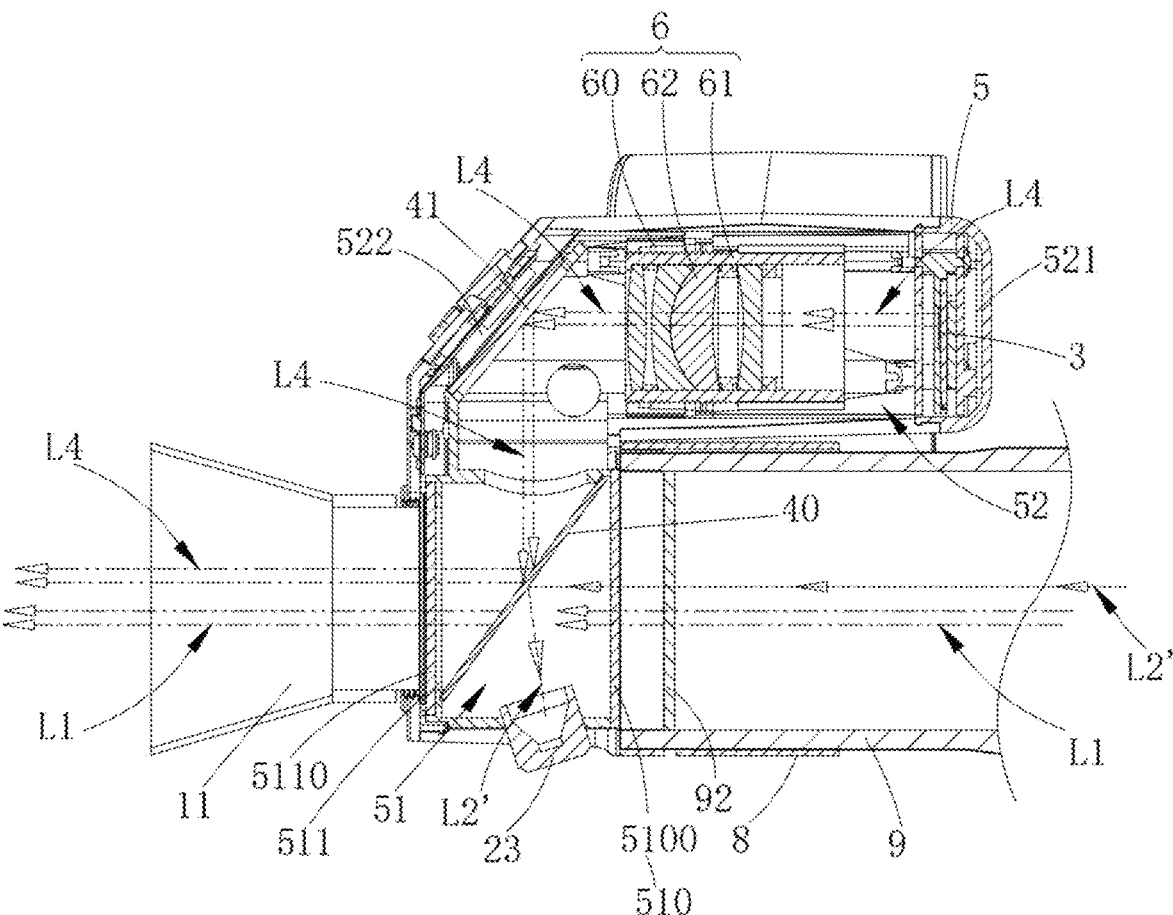
FIG. 14 is a schematic view of the detection ray and the reflected light of the detection mechanism according to some embodiments of the present disclosure, with the receiver in a first accommodating cavity.

As shown in FIG. 14, in some embodiments, the receiver 23 may be located in the first accommodating cavity 51. The reflected light L2' of the detection ray L2 may pass through the lens barrel 9, may be reflected by the deflecting mirror 40, and may be then directed to the receiver 23. Specifically, the receiver 23 may be arranged between the connection port 510 and the deflecting mirror 40, with the receiving port of the receiver 23 facing the deflecting mirror 40, allowing the receiver 23 to receive the reflected light L2' of the detection ray L2 that may have been reflected by the deflecting mirror 40. The reflected light L2' of the detection ray L2 may be received by the objective lens 91 on the lens barrel 9 along with the external light L1. The external light L1 passes through the deflecting mirror 40 and may be directed towards the observation port 511, while the reflected light L2' of the detection ray L2 may be reflected by the deflecting mirror 40 to the receiver 23. The reflected light L2' of the detection ray L2 may be an invisible light and may be reflected by the deflecting mirror 40. By utilizing the objective lens 91 with a larger aperture on the optical sight, the receiver 23 located in the first accommodating cavity 51 may receive the reflected light L2' of the detection ray L2 more stably. Furthermore, since the objective lens 91 has a larger aperture and a greater light intake, it may further enhance an ability of the receiver 23 to receive the reflected light L2' of the detection ray L2, achieving a distance measurement of farther target objects. The objective lens 91 with a large aperture may further improve an anti-interference ability of the ranging mechanism 2 to environmental factors during a measurement process of the target object. In short, compared to a small-aperture receiving objective lens on a traditional rangefinder, the receiver 23 in this embodiment may receive the reflected light L2' of the detection ray L2 relying on the objective lens 91 of the optical sight with a large aperture, which may greatly enhance the ranging capability of the detection mechanism 2.

It should also be noted that the reflected light L2' of the detection ray L2 and the external light L1 may be actually coaxial and overlapping, and may be received together by the objective lens 91 on the lens barrel 9 to enter an interior of the lens barrel 9. The receiver 23 may include a ranging laser sensor, or may further include one or more plurality of lenses. The ranging laser sensor may acquire the measurement information of a distance from the ranging laser sensor to the target object by receiving the reflected light L2' of the detection ray L2, and finally may transmit the reflected light L2' to the display 3, which may then emit the display light L4 containing the measurement information. In other embodiments, when the receiver 23 is located in the first accommodating cavity 51, the one or more reflective mirrors may also be arranged between the receiver 23 and the deflecting mirror 40. By a reflecting function of the one or more reflective mirrors, a mounting position and an opening direction of the receiver 23 may be determined according to actual needs. In addition, by separating the receiver 23 from the transmitter 22, a volume of the third accommodating cavity 53 may be smaller, thus reducing the overall volume of the aiming assistance device.

Referring to FIG. 6, in some embodiments, the aiming assistance device may further include a power unit 71, and the housing 5 may further define a fourth accommodating cavity 54. The power unit 71 may be mounted in the fourth accommodating cavity 54 and may be electrically connected to the detection mechanism 2 and the display 3. Specifically, the fourth accommodating cavity 54 may have a second wiring hole 540 that may be communicated with the third accommodating cavity 53, so that wires of the power unit 71 may be connected to the detection mechanism 2 through the second wiring hole 540, and may also be connected to the display 3 through the second wiring hole 540, the third accommodating cavity 53, the first wiring hole 531, and the second accommodating cavity 52, thereby providing power to the detection mechanism 2 and the display 3. As shown in FIG. 6, the power unit 71 may be a cylindrical energy storage battery. A length direction of the fourth accommodating cavity 54 may be roughly parallel to a length direction of the third accommodating cavity 53, and the fourth accommodating cavity 54 may be located on a side of the third accommodating cavity 53 in a radial direction of the third accommodating cavity 53 and away from the lens barrel 9. In other embodiments, the fourth accommodating cavity 54 may be formed in a space between the second accommodating cavity 52 and the upper handwheel 901 to make full use of an empty space of the lens barrel 9 in axial direction of the lens barrel 9. The power unit 71 may also be externally connected to any position on the outer wall of the housing 5 or to any position on the outer wall of the lens barrel 9. It should also be noted that the power unit 71 may also charge the components in the housing 5 in a wireless manner.

Figure 4:
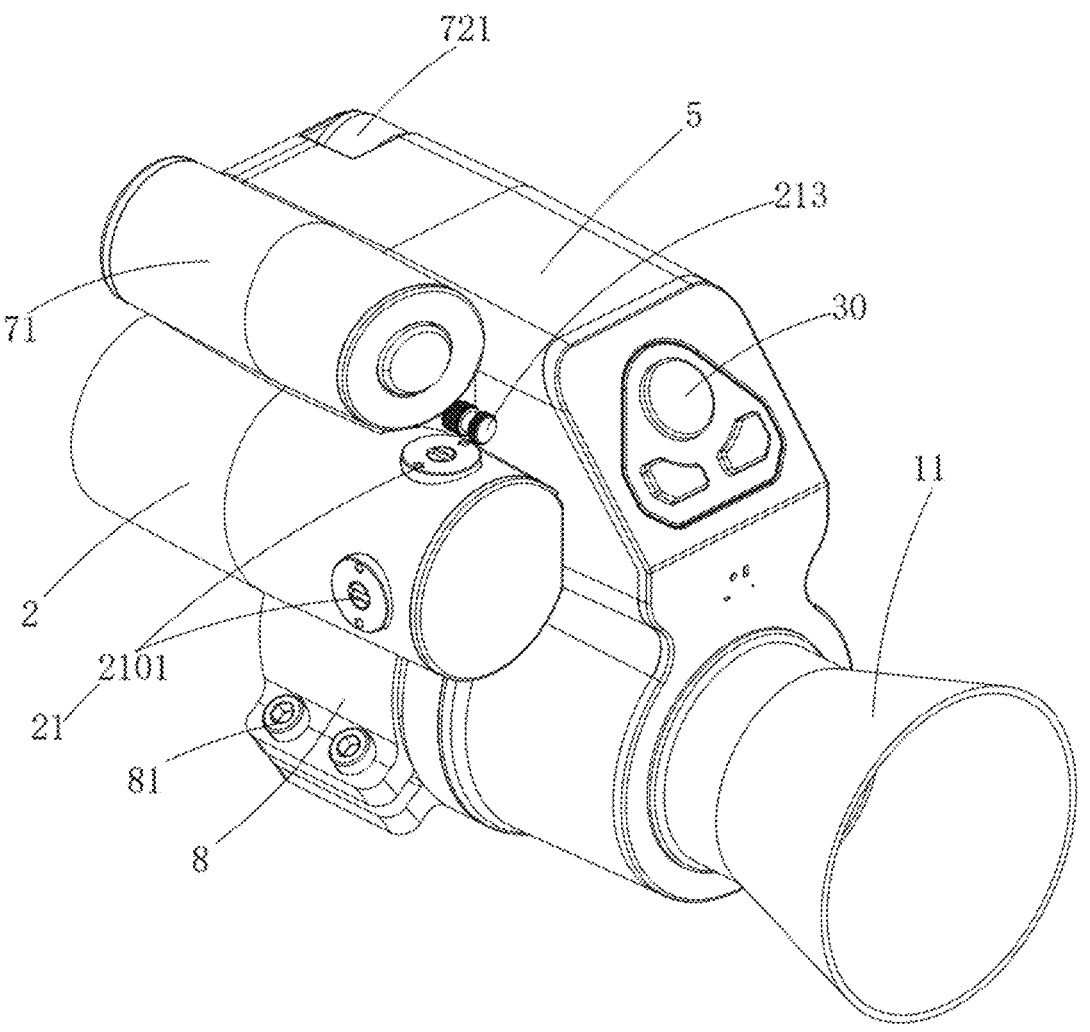
FIG. 4 is a schematic view of an overall structure of the aiming assistance device according to some embodiments of the present disclosure.

As shown in FIG. 4, the aiming assistance device may further include an operation button 30, and the operation button 30 may be arranged on the outer wall of the housing 5. The operation button 30 may be electrically connected to the display 3 via a flat cable. The measurement information displayed on the display 3 may be controlled through the operation button 30. Specifically, the operation button 30 may be arranged on an outer side of the housing 5 close to the second mounting end 522 so that the operation button 30 may face the user during use, making the operation button 30 convenient for the user to operate. The operation button 30 and the display 3 may be connected with each other via a flat cable. The flat cable may be arranged to fit the inner wall of the housing 5 for forming the second accommodating cavity 52, thereby preventing the flat cable from interfering with the display light L4. It should also be noted that a main control board may be arranged at a location of the operation button 30. Power of the power unit 71 may be distributed to the detection mechanism 2 and the display 3 via the main control board. The main control board may be integrated Bluetooth, which may allow the aiming assistance device to establish a connection with a mobile terminal such as a mobile phone, and transmit the measurement information to the mobile terminal. Correspondingly, information from the mobile terminal may also be sent to the main control board in this communication manner, so that the measurement information may further include information sent from the mobile terminal, enriching the measurement information image finally presented. Functional sensors such as a temperature and humidity sensor and a gravity sensor may also be integrated or connected to the main control board, and information acquired by the functional sensors may be displayed on the display 3 and transmitted to the user's eye through the light deflection module 4. It should also be noted that a wireless connection method such as Bluetooth may also be adopted for data transmission between the detection mechanism 2 and the main control board.

Figure 11:
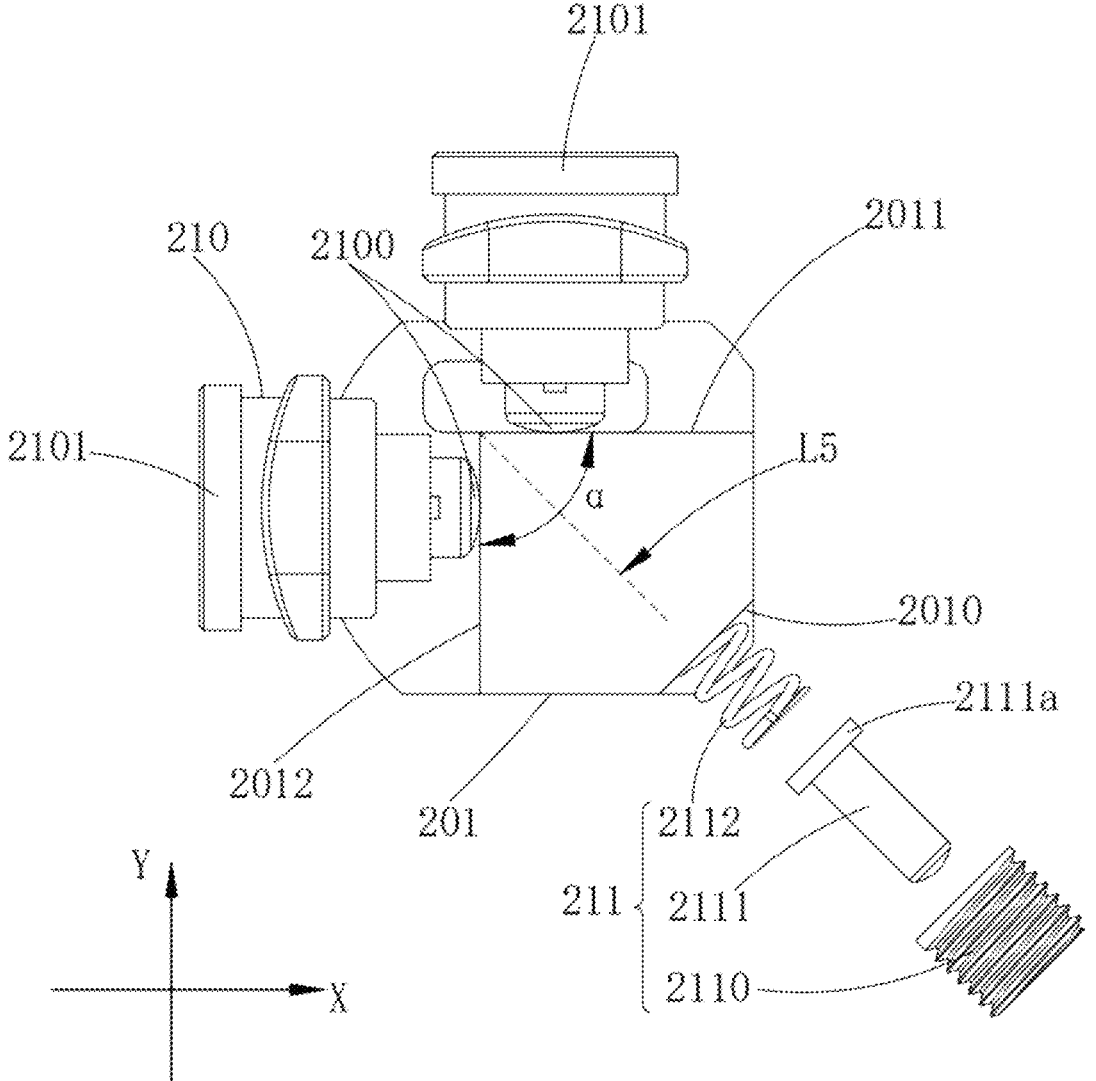
FIG. 11 is a structural view of a leveling assembly and an adjustment tail according to some embodiments of the present disclosure.
Figure 12:
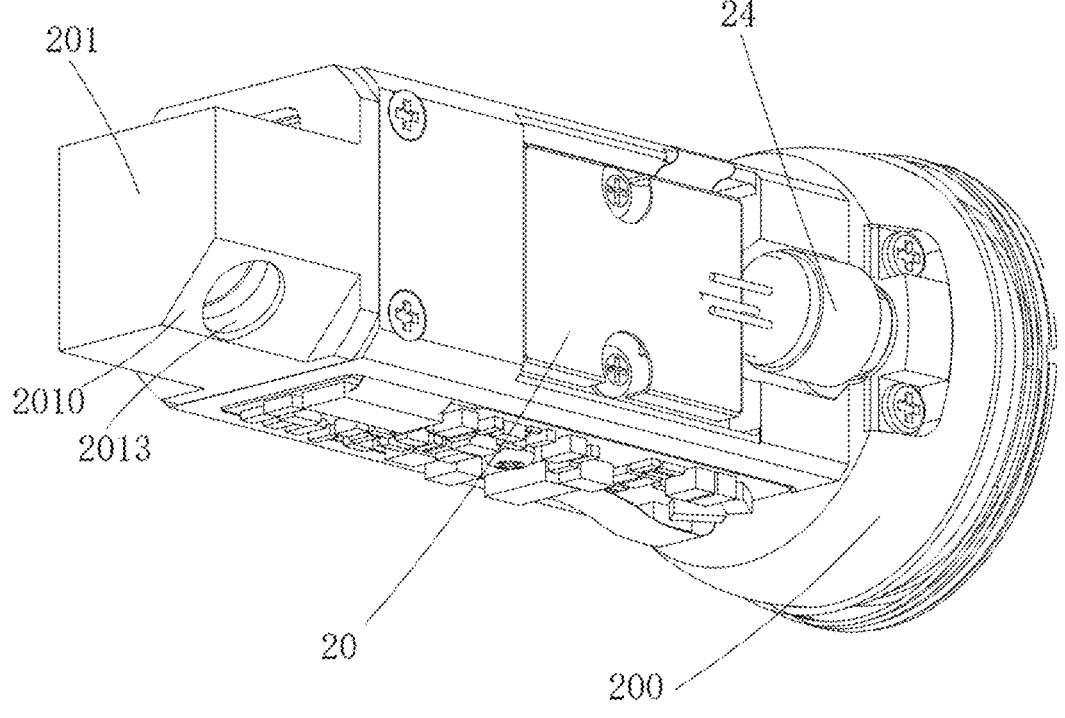
FIG. 12 is a structural view of a detection body according to some embodiments of the present disclosure.

Referring to FIGS. 6, 11, and 12, in some embodiments, the detection mechanism 2 may include a detection body 20 and a leveling assembly 21. The detection body 20 may include a detection ball head 200 at a front end of the detection body 20 and an adjustment tail 201 at a rear end of the detection body 20. The detection ball head 200 may be arranged at the opening 530 of the third accommodating cavity 53 and may emit the detection ray L2. The leveling assembly 21 may be mounted at an end of the third accommodating cavity 53 away from the opening 530. The leveling assembly 21 may change a parallelism between the detection ray L2 and an aiming centerline of the optical sight. It should be noted that when the optical sight is in use, an internal reticle may often need to be adjusted through the adjustment handwheel 90 to change an angle of the aiming centerline. Therefore, the detection ray L2 emitted by the detection body 20 may need to be kept parallel to the aiming centerline of the optical sight to reduce a measurement error of the detection body 20 and improve measurement accuracy. The detection body 20 may be an infrared rangefinder. The detection ball head 200 may be mounted at the front end of the third accommodating cavity 53, and the detection ray L2 may pass through the opening 530. The adjustment tail 201 may be arranged at the rear end of the third accommodating cavity 53. The detection ball head 200 and the adjustment tail 201 may be connected with each other through a connecting frame plate, and a corresponding detection circuit board may be arranged on the connecting frame plate. During mounting of the detection body 20 to the third accommodating cavity 53, there may be a mounting error that may cause a parallelism deviation between the detection ray L2 and the aiming centerline of the optical sight, or the detection body 20 may be slightly displaced due to bumps encountered during use of the aiming assistance device, resulting in a parallelism deviation between the detection ray L2 and the aiming centerline of the optical sight. In order to avoid such parallelism deviations, the leveling assembly 21 may be mounted on the housing 5. The leveling assembly 21 may be partially exposed out of and partially placed in the third accommodating cavity 53 to be connected with the adjustment tail 201. By changing a radial position of the adjustment tail 201, the detection ball head 200 may be radially displaced, thereby reducing the parallelism error between the detection ray L2 and the aiming centerline of the optical sight, making the detection ray L2 parallel to the aiming centerline of the optical sight, and ensuring that the measurement information acquired by the detection body 20 may be more accurate.

Referring to FIG. 11, in some embodiments, the adjustment tail 201 may include a first stress-bearing face 2011 and a second stress-bearing face 2012. The first stress-bearing face 2011 and a second stress-bearing face 2012 may be arranged at an angle relative to each other. The leveling assembly 21 may include at least two leveling knobs 210 and an elastic bearing member 211. One of the leveling knobs 210 may be rotatably mounted on a cavity wall of the housing 5 for forming the third accommodating cavity 53 and may abut against the first stress-bearing face 2011, and another of the leveling knob 210 may be rotatably mounted on the cavity wall of the housing 5 for forming the third accommodating cavity 53 and may abut against the second stress-bearing face 2012. The clastic bearing member 211 may be elastically connected the adjustment tail 201 and the inner wall of the housing 5 for forming the third accommodating cavity 53. An clastic force of the clastic bearing member 211 may make each of the first stress-bearing face 2011 and the second stress-bearing face 2012 abut against a respective one of the leveling knobs 210. Specifically, the leveling knob 210 may be threaded to the cavity wall of the housing 5 for forming the third accommodating cavity 53. The adjustment tail 201 may be a block-shaped structure, and the first stress-bearing face 2011 and the second stress-bearing face 2012 may be intersected with each other to form a right angle α. A direction of the elastic force of the elastic bearing member 211 may coincide with an angle bisector L5 of the right angle α. In other words, axial forces of the two leveling knobs 210 and the clastic force of the clastic bearing member 211 act on the adjustment tail 201 from three different directions, balancing force application points of the adjustment tail 201 in a circumferential direction of the adjustment tail 201. Specifically, one of the leveling knobs 210 may abut against the first stress-bearing face 2011, another of the leveling knobs 210 may abut against the second stress-bearing face 2012. The adjustment tail 201 may be arranged with a bearing face 2010. The clastic bearing member 211 may be mounted on the bearing face 2010, and an end of the elastic bearing member 211 may abut against an inner wall of the housing 5 for forming the third accommodating cavity 53. During use, referring to FIG. 11, by rotating the leveling knob 210 that contacts the first stress-bearing face 2011, the adjustment tail 201 may be displaced in a Y-axis direction; and by rotating the leveling knob 210 that contacts the second stress-bearing face 2012, the adjustment tail 201 may be displaced in the X-axis direction, thereby realizing an adjustment of the parallelism between the detection ray L2 and the aiming centerline of the optical sight.

As shown in FIGS. 11 and 12, the clastic bearing member 211 may specifically include a connecting tube 2110 with external threads, a support rod 2111, and a support spring 2112. The adjustment tail 201 may define a stepped mounting hole 2013, which may be formed on the bearing face 2010. One end of the support rod 2111 may be arranged with a limit platform 2111a which may extend radially, and the other end of the support rod 2111 may abut against the inner wall for forming the third accommodating cavity 53. During mounting, the support spring 2112 may be placed in the stepped mounting hole 2013, an end of the support rod 2111 away from the support spring 2112 may be enabled to pass through the connecting tube 2110, and the connecting tube 2110 may be threaded to the adjustment tail 201 through the stepped mounting hole 2013, so that one end of the support spring 2112 may abut against an inner wall of the adjustment tail 201 for forming the stepped mounting hole 2013, and the other end may abut against the limit platform 2111a. The support rod 2111 may move axially relative to the connecting tube 2110. During use, when the leveling knob 210 compresses the first stress-bearing face 2011 or the second stress-bearing face 2012, the support spring 2112 in the adjustment tail 201 may be compressed, and the adjustment tail 201 may move in a corresponding direction relative to the support rod 2111.

Referring to FIGS. 4 and 6, in some embodiments, the leveling knob 210 may include a fine adjustment portion 2101 that may be exposed out of the third accommodating cavity 53, and a spherical portion 2100 that may be located in the third accommodating cavity 53. The spherical portion 2100 may abut against the first stress-bearing face 2011 or the second stress-bearing face 2012. By rotating the fine adjustment portion 2101, the spherical portion 2100 may press against the first stress-bearing face 2011 or the second stress-bearing face 2012. The arrangement of the spherical portion 2100 may reduce friction and resistance between the spherical portion 2100 and the adjustment tail 201, and reduce frictional loss. The exposed fine adjustment portion 2101 may be convenient for the user to operate.

To facilitate an operation of the fine adjustment portion 2101, the leveling assembly 21 may also include a fine adjustment rod 213 for rotating the fine adjustment portion 2101. The housing 5 may further define a receiving hole 56, and the fine adjustment rod 213 may be received in the receiving hole 56. Specifically, the fine adjustment portion 2101 may define a flat slot, and an end of the fine adjustment rod 213 may be a flat-head blade. In other embodiments, a cross slot may be formed on the fine adjustment portion 2101, with the end of the fine adjustment rod 213 corresponding to be a cross-head blade; or the fine adjustment portion 2101 may be a hexagonal nut, with the end of the fine adjustment rod 213 corresponding to be a hex wrench.

It should also be noted that, referring to FIGS. 3 and 12, the detection mechanism 2 may further include a visible laser emitter 24 for emitting a visible laser parallel to the detection ray L2, which may be used for an auxiliary leveling. It is because the detection ray L2 is an invisible infrared light, and when the detection body 20 is adjusted through the leveling assembly 21, the human eye may not directly see the detection ray L2. Therefore, the visible laser emitter 24 that may emit the visible laser may be arranged. The visible laser emitter 24 and the transmitter 22 that may emit the detection ray L2 may be fixed on the detection body 20, and the visible laser may remain parallel to the detection ray L2. Therefore, when making adjustments with the leveling assembly 21, it may be only necessary to make the visible laser parallel to the aiming centerline of the optical sight.

In summary, in some embodiments, when the aiming assistance device of the present disclosure does not include the detection mechanism 2 or the detection mechanism 2 is not mounted in a position described above, the light deflection module 4 and coupling lens assembly 6 may also be used on various optical sights. In other words, the display 3 may obtain target information in other ways. The display 3 may emit a light containing target information, which may be reflected by a light path of the light deflection module 4 and merged with the external light L1 passing through the lens barrel 9, so that the user may simultaneously obtain the image of the lens barrel 9 and the measurement image of the display 3. Furthermore, in addition to using the coupling lens 6 to adjust the diopter of the display 3, the light deflection module 4 may also be combined with other methods to adjust the diopter of the display 3, for example, by directly changing a position of the display 3 to change a distance between the display 3 and the light deflection module 4 to achieve diopter adjustment.

As shown in FIGS. 1-3, an optical sight is provided in the present disclosure. The optical sight may include the aiming assistance device described above. Specifically, the optical sight may include a lens barrel 9 and a plurality of adjustment handwheels 90 arranged protruding from an outer wall of the lens barrel 9. A front end of the lens barrel 9 may be arranged with an objective lens 91, and a rear end of the lens barrel 9 may be arranged with an eyepiece 92. During use, the front end of the lens barrel 9 may face the target object while the rear end of the lens barrel 9 may be positioned adjacent to the user's eye, and the aiming assistance device may be mounted close to the eyepiece 92 of the lens barrel 9 for use.

When the aforementioned aiming assistance device is mounted on the optical sight for use, the projection of the detection mechanism 2 in the circumferential direction may coincide with the gap area 900, thereby allowing the detection ray L2 to pass through the gap area 900. Moreover, the distance D1 between the detection ray L2 and the axis L3 of the lens barrel 9 may be smaller than the minimum distance D3 between the adjustment handwheel 90 and the axis L3 of the lens barrel 9. This arrangement may ensure that the height of the detection mechanism 2 radially protruding from the outer wall of the lens barrel 9 is less than the height of the adjustment handwheel 90 radially protruding from the outer wall of the lens barrel 9, which effectively reducing a size of the detection mechanism 2 radially protruding from the lens barrel 9, making the overall volume of the optical sight equipped with the aiming assistance device smaller, and may be convenient for the user to carry. Moreover, a smaller distance between the detection ray L2 and the axis L3 of the lens barrel 9 may further reduce an error of the measurement information obtained by the detection mechanism 2 and improve measurement accuracy of the detection mechanism 2.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

What is claimed is:

1. An aiming assistance device, configured to be mounted on an optical sight, wherein the optical sight comprises a lens barrel and a plurality of adjustment handwheels protruding from an outer wall of the lens barrel, a gap area is formed between any two of the plurality of adjustment handwheels which are adjacent to each other, and the lens barrel is configured for an external light to pass through; the aiming assistance device comprises:

a detection mechanism, configured to emit a detection ray and obtain measurement information via the detection ray, wherein the detection ray is capable of passing through the gap area;

a display, configured to emit a display light containing the measurement information; and a light deflection module, configured to reflect the display light, wherein the external light is capable of passing through the light deflection module.

2. The aiming assistance device according to claim 1, further comprising a housing, the housing is detachably connected to the lens barrel, and the housing is configured to accommodate the display, the light deflection module, and the detection mechanism;

the housing defines a first accommodating cavity and a second accommodating cavity, and the first accommodating cavity and the second accommodating cavity are communicated with each other; the first accommodating cavity has an observation port and a connection port, the observation port and the connection port are formed opposite each other, and the housing is connected to the lens barrel at the connection port; the light deflection module is arranged in at least one of the first accommodating cavity and the second accommodating cavity, and the display is arranged in the second accommodating cavity.

3. The aiming assistance device according to claim 2, wherein the light deflection module comprises a deflection member, the deflection member is arranged obliquely in the first accommodating cavity, the deflection member is arranged between the observation port and the connection port, the deflection member is configured to reflect the display light and enable the display light to pass through the observation port, and the deflection member allows the external light passing through the lens barrel to pass through.

4. The aiming assistance device according to claim 3, wherein the second accommodating cavity comprises a first mounting end and a second mounting end, the first mounting end and the second mounting end are formed away from each other, the second mounting end is close to and communicated to the first accommodating cavity, and the display is fixed at the first mounting end;

the light deflection module further comprises a total reflection member, the total reflection member is arranged obliquely at the second mounting end, and the total reflection member is configured to reflect the display light to the deflection member.

5. The aiming assistance device according to claim 4, wherein the housing further comprises a mounting barrel and a connecting plate extending along a radial direction of the mounting barrel, and the mounting barrel is an internal portion of the housing;

the first accommodating cavity is formed in the mounting barrel, an inner wall of the mounting barrel defines an inclined slot, and the deflection member is inserted in the inclined slot; the connecting plate extends to the second mounting end of the second accommodating cavity, and the total reflection member is fixed on the connecting plate.

6. The aiming assistance device according to claim 2, wherein the housing further defines a third accommodating cavity, the third accommodating cavity has an opening at a front end of the third accommodating cavity, the detection mechanism is mounted in the third accommodating cavity, and the detection ray is capable of passing through the opening.

7. The aiming assistance device according to claim 6, wherein the detection mechanism comprises a detection body and a leveling assembly;

the detection body comprises a detection ball head arranged at a front end of the detection body and an adjustment tail arranged at a rear end of the detection body, the detection ball head is arranged at the opening of the third accommodating cavity and is configured to emit the detection ray;

the leveling assembly is mounted at an end of the third accommodating cavity away from the opening, and the leveling assembly is configured to change a parallelism between the detection ray and an aiming center line of the optical sight.

8. The aiming assistance device according to claim 7, wherein the adjustment tail comprises a first force-bearing face and a second force-bearing face, the first force-bearing face and the second force-bearing face are arranged at an angle relative to each other, and the leveling assembly comprises:

at least two leveling knobs, wherein one of the at least two leveling knobs is rotatably mounted on a cavity wall of the housing for forming the third accommodating cavity and abuts against the first force-bearing face, and another of the at least two leveling knobs is rotatably mounted on the cavity wall of the housing for forming the third accommodating cavity and abuts against the second force-bearing face; and an elastic bearing member, elastically connected to the adjustment tail and an inner wall of the housing for forming the third accommodating cavity, the elastic bearing member is configured to enable each of the first force-bearing face and the second force-bearing face to abut against a respective one of the at least two leveling knobs via an elastic force of the elastic bearing member.

9. The aiming assistance device according to claim 8, wherein the first force-bearing face and the second force-bearing face are intersected to each other to define a vertical included angle, and a direction of the elastic force of the elastic bearing member coincides with an angle bisector of the vertical included angle.

10. The aiming assistance device according to claim 8, wherein each of the at least two leveling knobs comprises a fine adjustment portion exposed out of the third accommodating cavity and a spherical portion arranged in the third accommodating cavity, the spherical portion is configured to abut against one of the first force-bearing face and the second force-bearing face, and the fine adjustment portion is configured to be rotated to enable the spherical portion press against the one of the first force-bearing face and the second force-bearing face.

11. The aiming assistance device according to claim 10, wherein the leveling assembly further comprises a fine adjustment rod configured to control the fine adjustment portion to rotate, the housing further defines a receiving hole, and the fine adjustment rod is received in the receiving hole.

12. The aiming assistance device according to claim 1, wherein the detection mechanism comprises an emitter and a receiver, the emitter is configured to emit the detection ray, and the receiver is configured to receive a reflected light of the detection ray;

the reflected light of the detection ray is capable of passing through the gap area and then being incident on the receiver; or, the reflected light of the detection ray is capable of passing through the lens barrel and then being reflected to the receiver by the light deflection module.

13. The aiming assistance device according to claim 12, further comprising a housing, wherein the housing defines a first accommodating cavity and a third accommodating cavity, the first accommodating cavity is configured to house a part of the light deflection module, and a cavity wall of the housing for forming the first accommodating cavity is connected to the lens barrel;

a projection of the third accommodating cavity along an axial direction of the lens barrel at least partially overlaps with the gap area, and each of the emitter and the receiver is arranged in the third accommodating cavity.

14. The aiming assistance device according to claim 12, further comprising a housing, wherein the housing defines a first accommodating cavity and a third accommodating cavity, the first accommodating cavity is configured to house a part of the light deflection module, and a cavity wall of the housing for forming the first accommodating cavity is connected to the lens barrel;

a projection of the third accommodating cavity along an axial direction of the lens barrel at least partially overlaps with the gap area, the emitter is arranged in the third accommodating cavity, and the receiver is arranged in the first accommodating cavity.

15. The aiming assistance device according to claim 1, further comprising a coupling lens assembly located between the display and the light deflection module for adjusting imaging clarity of the display;

the coupling lens assembly comprises a sleeve with a passage extending between two opposing ends of the sleeve and at least one dioptric spherical lens arranged in the sleeve, the sleeve is movably arranged, and the sleeve is configured to be driven to change a distance between the dioptric spherical lens and the display.

16. The aiming assistance device according to claim 15, wherein the coupling lens assembly further comprises a mounting barrel, the mounting barrel defines a threaded hole, the sleeve comprises a threaded portion and an adjustment portion, the threaded portion is thread-connected to the mounting barrel via the threaded hole, and the adjustment portion is configured to enable the sleeve to rotate.

17. The aiming assistance device according to claim 16, wherein the adjustment portion defines a gear slot, and the gear slot is formed on an outer wall of the sleeve; the aiming assistance device further comprises an adjustment rod, the adjustment rod is rotatably mounted on the housing, and the adjustment rod comprises a gear end and a handwheel end; the gear end is arranged in the second accommodating cavity and is meshed with the gear slot, and the handwheel end is arranged out of the housing.

18. The aiming assistance device according to claim 17, wherein an outer wall of the housing defines an accommodating recess for accommodating the handwheel end.

19. An optical sight, comprising the aiming assistance device according to claim 1.

* * * * *